July 19, 1955 K. ZWICK 2,713,289
COPYING MACHINE
Filed Nov. 30, 1951
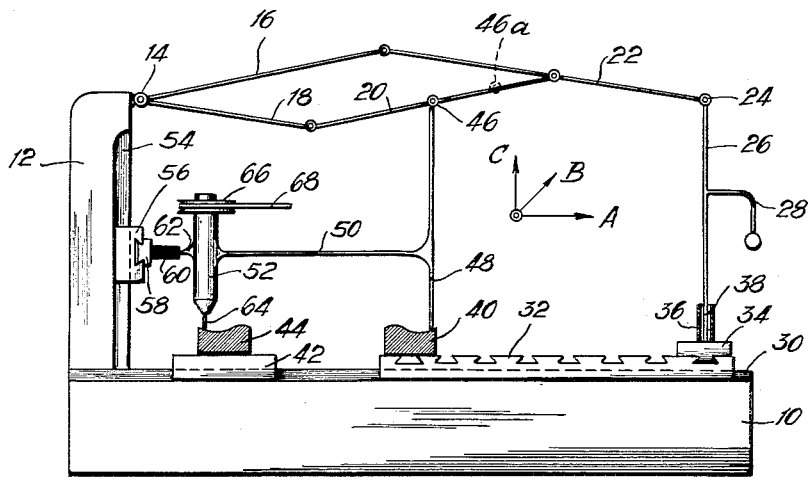
INVENTOR
Kurt Zwick,
BY John B Brady
ATTORNEY

United States Patent Office 2,713,289
Patented July 19, 1955

2,713,289
COPYING MACHINE

Kurt Zwick, Munich, Germany, assignor to Hans Deckel, Munich-Solln, Germany, and Friedrich Wilhelm Deckel, Post Tutzing, Germany Application November 30, 1951, Serial No. 259,067

4 Claims. (Cl. 90—13.1)

My invention relates broadly to copying machines and more particularly to an improved copying machine and attachment therefore, employing an improved arrangement of pantograph system in connection with a tracing pin and a coacting tool.

Heretofore in the art there have been copying machines in which through the movement of the tool in one direction a movement variable in any desired ratio can be imparted to the work across an additional friction transmission, for example in the same direction in carrying out mirror operations. The necessity of using an additional device has the disadvantage, however, that this increases the purchase price of the machine.

In contrast to such known devices the present invention provides a structure by using means already existing on the machine, which forms a simple and hence economical copying device for the said purpose. In copying machines with a movable pantograph system, in which the tracing pin can be inserted at a point of the pantograph and rigidly connected with the tool which moves over the guide parts, this problem is solved according to this invention in that the model table is coupled with another point of the pantograph system in such a way, that when moving the tracing pin in one direction, the movement of the model table in the same direction, adjustable in any desired ratio over the pantograph system, is produced. If, however, in copying machines of the kind referred to the tool bearing is inserted at a point of the pantograph and connected with the tracing pin over guide parts, the problem posed can be solved according to this invention also in that the working table is coupled with another point of the pantograph in such a way that when moving the tool bearing in one direction, a movement of the working table in the same direction is produced adjustable over the pantograph system in any desired ratio.

In the following specification, forms of the invention are illustrated diagrammatically with reference to the drawing, which shows a preferred form of the invention in front view.

The copying machine as shown in the drawing consists of a base 10 carrying a vertical column 12. On this column there is, at 14, a pantograph of known type consisting of the links 16, 18, 20 and 22 mounted in such a manner that on the one hand it is movable in its plane and, on the other, pivotable about the bearing point 14. At point 24 of the pantograph there is mounted a vertical member 26 which has a handle 28. By actuation of this handle the entire pantograph system can be moved in the desired direction.

In the base 10 there is provided a horizontal guide 30 in which a slide 32 is displaceably mounted. A second slide 34 is mounted on the slide 32 for displacement transverse to the direction of displacement of the latter. The slide 34 supports a vertical guide bushing 36 in which the lower end 38 of the axis 26 engages for axial movement. The slide 32 is designed as a machine table on which a model 40 can be placed. In the guide 30 there is arranged another slide 42, likewise designed as a table, on which a workpiece 44 is fastened. The slide 42 carrying workpiece 44 is provided to permit an accurate setting of the workpiece 44 in the required base position in relation to the tool before the beginning of the work thereon. During the work operation it is unnecessary to change the position of slide 42.

A vertically extending tracing pin 48 is articulately connected with point 46 of the pantograph. This tracing pin 48 is rigidly coupled with a tool bearing 52 by means of a rigid connection part 50. The tool bearing 52 is supported by means of a cross slide 56, 58, displaceable in the guide 54 in the column 12 and a guide pin 62 engaging in the bearing bushing 60 of the slide 58. The tool 64 is driven by a pulley 66 and a belt 68 by a power source not shown.

The mode of operation of the described device is the following:

If a workpiece is to be produced according to the model in mirror-reversed manner, the machine must be set as shown in Fig. 1. The model 40 and the workpiece 44 must be fastened in the proper working position on the tables 32 or 42, and the lower end of the axis 26 must be inserted in the guide bushing 36 of the slide 34. When the tracing pin 48 and the member 26 are inserted, the former in the running point 46 and the latter in the writing point 24 of the pantograph, as shown, the movement paths of the tracing pin 46 and of the member 26 carried out in the plane of the pantograph have a ratio of 1:2.

If the member 26 of the pantograph is now moved by means of the handle 28 for example in the horizontal direction of the arrow A, then the model table 32 with the model 40 will move along the guide 30 with twice the speed of the tracing pin 48 in the same direction, that is, the model precedes the tracing pin by twice the length of the path. Due to the rigid connection between the tracing pin 48 and the tool bearing 52, this fact expresses itself on the fixed work in that the tool 64 gives the work 44 in this direction a shape mirror-symmetrical to the model 40.

The movement of the member 26 in the horizontal transverse direction, which is indicated in the perspective view ABC diagrammatically by the arrow B, has as its consequence a transverse movement of the slide 34 in relation to the now fixed table 32. Accordingly, when the tracing pin 48 is moved in the transverse direction, the tool bearing 52 is moved in the same direction by the same increments in relation to the model 40, the workpiece 44 being stationary during such movement.

The moving of the member 26 in the direction of height, that is, in the direction of the arrow C, has as its consequence only a relative movement of this member 26 in relation to the guide bushing 36. The slide 34 and also the table 32 then remain stationary, so that the tracing pin 48 and the tool bearing 64 are moved in the same direction and by equal increments in relation to the stationary model or workpiece.

It will be understood that the tracing pin (or the tool bearing) need not always be connected only with point 46 of the pantograph. There may be used as transmission point, also another point, for example point 46a, of the pantograph. In such a case, rather than operating in mirror symmetry with a transmission ratio of 1:2 at the pantograph, there is machined according to the model a workpiece which is mirror-symmetrically distorted, and this in a measure which corresponds to the adjusted transmission ratio on the pantograph.

The invention may also be carried out as an attachment for existing machines by applying the pantograph system, the cross slides, and the parts for making the rigid connection between the tracing pin and the tool bearing, in such arrangement, that such a machine can be used in the manner of the invention without the use of additional devices.

While the invention has been described in certain preferred embodiments, I realize that modifications may be made and I desire that it be understood that no limitations upon my invention are intended other than may be imposed by the scope of the appended claims.

What I claim as new, and desire to secure by Letters Patent of the United States, is as follows:

1. A copying machine comprising a frame structure, a work table transversely slidably on said frame structure, a model table slidably mounted on said frame structure in a position displaced from said work table, a support on said frame structure, a tool bearing adjustably mounted on said frame structure, a rotatably driven tool mounted in said tool bearing, a workpiece mounted on said work table and engageable by said rotary driven tool, a model carried by said model table, a pantograph system supported on said support, a tracing pin connected with a point of said pantograph system and engageable with said model, a connection between said tracing pin and said tool bearing, and means connecting another point of said pantograph system with said model table whereby the movement of the tracing pin in one direction produces a corresponding displacement of the model table in the same direction, said displacement being adjustable in any desired ratio over the pantograph system.

2. A copying machine of the movable pantograph type comprising a supporting structure having a horizontally extending base portion and a vertically extending column adjacent one side thereof, a work table mounted on said horizontally extending base portion, a workpiece secured to said work table, a model table slidably mounted on said base structure and movable toward and away from said work table, a model carried by said model table, a tool bearing, means for mounting said tool bearing over said work table for adjustable movement with respect thereto, a rotary driven tool carried by said tool bearing, a pantograph system pivotally connected with said vertically extending column, a pair of members connected at spaced positions with said pantograph system, one of said members being connected with said adjustable model table for controlling the movement thereof and the other of said members engaging said model as a tracing pin for following the contour thereof and a connection between said tool bearing and said last mentioned member whereby said tool may be variably moved over the surface of said workpiece.

3. A copying machine as set forth in claim 2 in which said pantograph system comprises four pivotally connected links and wherein the member which constitutes said tracing pin connects to a point intermediate the pivotal connections of one of said links with the coacting links of said pantograph system and where said member which connects with said model table connects to a junction point between two of the links of the pantograph system.

4. A copying machine as set forth in claim 2 in which the member which connects said model table with said pantograph system is slidably coupled in a direction with said model table for permitting vertical movement of said pantograph system simultaneously with lateral displacement of said model table.

References Cited in the file of this patent
UNITED STATES PATENTS

| | | |
|---|---|---|
| 614,845 | Dedrick | Nov. 29, 1898 |
| 761,349 | Barr | May 31, 1904 |
| 1,707,914 | Lampe | Apr. 2, 1929 |
| 2,161,709 | Henkes | June 6, 1939 |